(12) United States Patent
Zhang et al.

(10) Patent No.: US 11,010,924 B2
(45) Date of Patent: May 18, 2021

(54) METHOD AND DEVICE FOR DETERMINING EXTERNAL PARAMETER OF STEREOSCOPIC CAMERA

(71) Applicant: HANGZHOU HIKVISION DIGITAL TECHNOLOGY CO., LTD, Hangzhou (CN)

(72) Inventors: Di Zhang, Hangzhou (CN); Hui Gong, Hangzhou (CN); Ye Ren, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/340,901

(22) PCT Filed: Sep. 30, 2017

(86) PCT No.: PCT/CN2017/105061
§ 371 (c)(1),
(2) Date: Apr. 10, 2019

(87) PCT Pub. No.: WO2018/068678
PCT Pub. Date: Apr. 19, 2018

(65) Prior Publication Data
US 2019/0236807 A1   Aug. 1, 2019

(30) Foreign Application Priority Data

Oct. 12, 2016   (CN) .......................... 201610889992.7

(51) Int. Cl.
*G06T 7/80* (2017.01)
*G06T 7/70* (2017.01)
*H04N 5/232* (2006.01)
*G06T 7/73* (2017.01)
*H04N 13/246* (2018.01)

(52) U.S. Cl.
CPC ................. *G06T 7/85* (2017.01); *G06T 7/70* (2017.01); *G06T 7/73* (2017.01); *H04N 5/232* (2013.01);
(Continued)

(58) Field of Classification Search
CPC .... G06T 7/85; G06T 7/73; G06T 7/70; H04N 13/246; H04N 5/232
See application file for complete search history.

(56) References Cited

U.S. PATENT DOCUMENTS

| | | |
|---|---|---|
| 8,970,709 B2 | 3/2015 | Gonzalez-Banos et al. |
| 2011/0052043 A1 | 3/2011 | Hyung et al. |

(Continued)

FOREIGN PATENT DOCUMENTS

| | | |
|---|---|---|
| CN | 102736634 A | 10/2012 |
| CN | 103718213 A | 4/2014 |

(Continued)

OTHER PUBLICATIONS

Anonymous: "Euler angles—Wikipedia", Oct. 10, 2016, pp. 1-11, XP055604715; Retrieved from the Internet: URL:https://en.wikipedia.org/w/index.php?title=Euler_angles&oldid=743695911 retrieved on Jul. 11, 2019.

(Continued)

*Primary Examiner* — Mishawn N. Hunter
(74) *Attorney, Agent, or Firm* — Clements Bernard Walker; Lawrence A. Baratta, Jr.

(57) ABSTRACT

Embodiments of application discloses a method and device for determining external parameters of a stereo camera. The method comprises: acquiring ground surface data of a location of the stereo camera; generating, according to three-dimensional coordinates of each pixel in the ground surface data in a camera coordinate system corresponding to the stereo camera, a first plane equation in the camera coordi- (Continued)

nate system that conforms to the three-dimensional coordinates of the pixels; determining, according to a distance between the origin of the camera coordinate system and the ground surface, a setting height of the stereo camera; and generating, according to the first plane equation, a plane normal vector corresponding to the first plane equation; and determining, according to the plane normal vector, a pitch angle of the stereo camera and an inclination angle of the stereo camera. The external parameters of the stereo camera can be determined without using a reference point in a scene.

18 Claims, 4 Drawing Sheets

(52) U.S. Cl.
CPC ....... *H04N 13/246* (2018.05); *G06T 2200/04* (2013.01); *G06T 2207/10012* (2013.01); *G06T 2207/20032* (2013.01); *G06T 2207/30244* (2013.01)

(56) References Cited

U.S. PATENT DOCUMENTS

2015/0310616 A1 10/2015 Gonzalez-Banos et al.
2017/0359561 A1* 12/2017 Vallespi-Gonzalez ...................... H04N 13/128

FOREIGN PATENT DOCUMENTS

CN 104463856 A 3/2015
CN 105474634 A 4/2016
EP 2615580 A1 7/2013

OTHER PUBLICATIONS

Rainer Kummerle et al: "Simultaneous Parameter Calibration, Localization, and Mapping" Advanced Robotics, vol. 26, No. 17, Dec. 1, 2012, pp. 2021-2041, XP55475511, NL.
Lingfeng Xu et al: "Hybrid plane fitting for depth estimation", Signal & Information Processing Association Annual Summit and Conference (APSIPA ASC), 2012 Asia-Pacific, IEEE, Dec. 3, 2012, pp. 1-4, XP032309973.
Feng Yicong, "The Quickly Automated Extraction of Building Facades Information from Mobile Lidar Point Clouds" Southwest Jiaotong University, Doctor Degree Dissertation;Sep. 10, 2014.
International Search Report for International Application No. PCT/CN2017/105061 dated Dec. 29, 2017.
Feng, Yicong, "The Quickly Automated Extraction of Building Facades Information from Mobile LiDAR Point Clouds", China Doctoral Dissertations Full-Text Database (Electronic Journals) Nov. 30, 2015; ISSN: 1674-022X, the main body, pp. 77-87.

* cited by examiner selecting at least three pixels from the pixels in the ground surface data by using a RANSAC (RANdom SAmple Consensus) algorithm, and using the three-dimensional coordinates of the at least three pixels in the camera coordinate system corresponding to the stereo camera as the first sample set — 11 generating, according to the first sample set, a current plane equation that conforms to the three-dimensional coordinates of pixels in the first sample set in the camera coordinate system — 12 determining whether the current plane equation satisfies a preset condition — 13 when the current plane equation satisfies the preset condition, determining the current plane equation as the second plane equation — 14 when the current plane equation does not satisfy the preset condition, increasing the number of iterations by 1, and returning to substep 11 — 15

Fig. 4

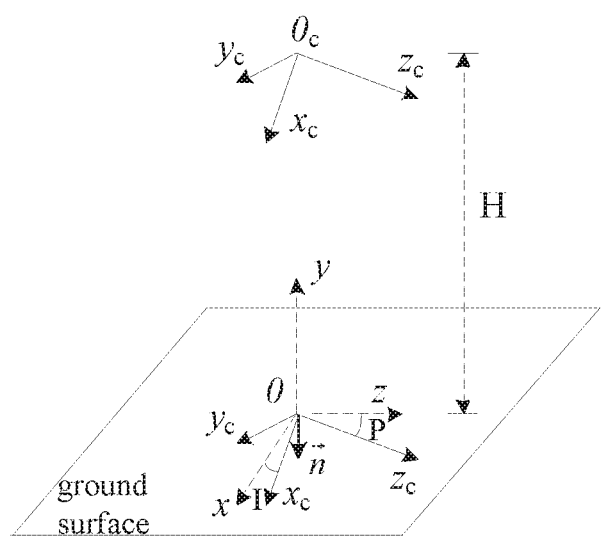

Fig. 5

METHOD AND DEVICE FOR DETERMINING EXTERNAL PARAMETER OF STEREOSCOPIC CAMERA

The present application claims the priority to a Chinese patent application No. 201610889992.7 filed with China National Intellectual Property Administration on Oct. 12, 2016, and entitled "Method And Device For Determining External Parameter Of Stereoscopic Camera", which is incorporated herein by reference in its entirety.

TECHNICAL FIELD

The present application relates to the field of image processing, and in particular, to a method and device for determining external parameters of a stereo camera.

BACKGROUND

With the rapid development of image processing technology, applications such as human detection, target tracking, object detection, distance detection, object scanning recognition and 3D reconstruction of a scene based on stereo vision images have also been rapidly developed.

In general, a stereo camera can be used to obtain stereoscopic images. Before obtaining a stereoscopic image using a stereo camera, the stereo camera should be calibrated in advance to determine accurate camera parameters. Specifically, the camera parameters include internal parameters and external parameters. The external parameters indicate the position and direction of the stereo camera in the world coordinate system. That is to say, the external parameters of a stereo camera represent the coordinate transformation relationship between the camera coordinate system and the world coordinate system. Further, the external parameters of the stereo camera have a great influence on the accuracy of the images captured by the stereo camera. Three parameters, i.e. the setting height of the stereo camera, the pitch angle of the stereo camera, and the inclination angle of the stereo camera are usually used as external parameters of the stereo camera. FIG. 1 is a schematic diagram of external parameters of a stereo camera. In the upper part of FIG. 1, the three-dimensional coordinate system formed by axis $x_c$ axis $z_c$ and axis $y_c$ is a camera coordinate system corresponding to the stereo camera, and the stereo camera is the origin of the camera coordinate, which is identified as $0_c$. On the ground plane of FIG. 1, the coordinate system formed by axis x, axis z and axis y represented by the dashed line is the world coordinate system, with the origin of 0. The camera coordinate system is translated to the ground plane, so that the origin $0_c$ of the camera coordinate system coincides with the origin 0 of the world coordinate system. The distance H between the ground plane and the origin of the camera coordinate system is the setting height of the stereo camera; the angle P is the pitch angle of the stereo camera, and the angle I is the inclination angle of the stereo camera.

At present, a method for determining external parameters of a stereo camera generally include:

inputting an initial values of the external parameters of the stereo camera;

capturing a scene image to detect a vertical edge perpendicular to the ground in the scene image;

evaluating the accuracy of the external parameters of the stereo camera according to the approximation of the shape of the vertical edge in the scene that is projected onto the coordinate plane in the world coordinate system with a circle;

if the accuracy of the external parameters of the stereo camera does not conform to the evaluation criteria, adjusting the external parameters of the stereo camera, and iterating the above evaluation process until the external parameters of the stereo camera conform to the evaluation criteria.

It can be seen that, in the prior art, in the method for determining the external parameters of the stereo camera, the accurate external parameters of the stereo camera must be determined by means of a vertical edge perpendicular to the ground in the scene as a reference point, which has a high requirement for the application scenario.

SUMMARY

The embodiments of application is to provide a method and a device for determining external parameters of a stereo camera, and the external parameters of the stereo camera can be determined without using a reference point in a scene. The specific technical solutions are as follows.

An embodiment of application discloses a method for determining external parameters of a stereo camera. The method includes: acquiring ground surface data of a location where the stereo camera is positioned; generating, according to three-dimensional coordinates of each of pixels in the ground surface data in a camera coordinate system corresponding to the stereo camera, a first plane equation in the camera coordinate system that conforms to the three-dimensional coordinates of the pixels; determining, according to a distance between an origin of the camera coordinate system and the ground surface, a setting height of the stereo camera; generating, according to the first plane equation, a plane normal vector corresponding to the first plane equation; and determining, according to the plane normal vector, a pitch angle of the stereo camera and an inclination angle of the stereo camera.

Preferably, the method further includes: performing filtering processing on the ground surface data when the ground surface data does not meet a preset condition; wherein the filtering processing includes median filtering in time domain and median filtering in spatial domain.

Preferably, generating, according to three-dimensional coordinates of each of pixels in the ground surface data in a camera coordinate system corresponding to the stereo camera, a first plane equation in the camera coordinate system that conforms to the three-dimensional coordinates of the pixels includes: selecting at least three pixels from pixels in the ground surface data, and using three-dimensional coordinates of the at least three pixels in the camera coordinate system corresponding to the stereo camera as a first sample set; generating, according to the first sample set, a second plane equation that conforms to three-dimensional coordinates of pixels in the first sample set in the camera coordinate system; determining, among the pixels in the ground surface data, all pixels that meet the second plane equation, and using the three-dimensional coordinates of the pixels that meet the second plane equation in the camera coordinate system as a second sample set; and generating, according to the second sample set, the first plane equation in the camera coordinate system that conforms to the three-dimensional coordinates of the pixels in the ground surface data in the camera coordinate system.

Preferably, selecting at least three pixels from pixels in the ground surface data includes: selecting at least three pixels from the pixels in the ground surface data by using a random sample consensus RANSAC algorithm.

Preferably, selecting at least three pixels from pixels in the ground surface data, and using three-dimensional coordinates of the at least three pixels in the camera coordinate system corresponding to the stereo camera as a first sample set and generating, according to the first sample set, a second plane equation that conforms to three-dimensional coordinates of pixels in the first sample set in the camera coordinate system includes: selecting at least three pixels from the pixels in the ground surface data by using a RANSAC algorithm, and using the three-dimensional coordinates of the at least three pixels in the camera coordinate system corresponding to the stereo camera as the first sample set; generating, according to the first sample set, a current plane equation that conforms to the three-dimensional coordinates of pixels in the first sample set in the camera coordinate system; determining whether the current plane equation satisfies a preset condition; using the current plane equation as the second plane equation when the current plane equation satisfies the preset condition; increasing the number of iterations by 1 when the current plane equation does not satisfy the preset condition and returning to perform the steps of selecting at least three pixels from pixels in the ground surface data, and using three-dimensional coordinates of the at least three pixels in the camera coordinate system corresponding to the stereo camera as a first sample set; wherein an initial value of the number of iterations is 0.

Preferably, the preset condition includes: the number of pixels, among the pixels in the ground surface data, that meet the current plane equation reaches a preset first threshold, or the number of iterations corresponding to the current plane equation reaches a preset second threshold.

Preferably, generating, according to the second sample set, the first plane equation in the camera coordinate system that conforms to the three-dimensional coordinates of the pixels in the ground surface data in the camera coordinate system includes: performing fitting processing on the second sample set by using a least squares method to generate the first plane equation that conforms to the three-dimensional coordinates of the pixels in the ground surface data in the camera coordinate system.

Preferably, determining, according to the plane normal vector a pitch angle of the stereo camera and an inclination angle of the stereo camera includes: determining, in the camera coordinate system, a first angle by which a corresponding axis $z_c$ rotates about an axis x in a clockwise direction when the stereo camera rotates from a standard attitude to a current attitude, and using the first angle as the pitch angle of the stereo camera; and determining, in the camera coordinate system, a second angle by which a corresponding axis $x_c$ rotates about an axis z in a clockwise direction when the stereo camera rotates from the standard attitude to the current attitude, and using the second angle as the inclination angle of the stereo camera; wherein a three-dimensional coordinate system defined by the axis $x_c$, the axis $z_c$, and an axis $y_c$ is the camera coordinate system; a three-dimensional coordinate system defined by the axis x, the axis z, and an axis y is a world coordinate system; when directions of the axis $x_c$ and the axis $z_c$ coincide with directions of the axis x and the axis z, and when direction of the axis $y_c$ is opposite to direction of the axis y, the stereo camera is in the standard attitude.

An embodiment of the present application further discloses a device for determining external parameters of a stereo camera. The device includes: an acquiring unit, configured for acquiring ground surface data of a location where the stereo camera is positioned; a first generating unit, configured for generating, according to three-dimensional coordinates of each of pixels in the ground surface data in a camera coordinate system corresponding to the stereo camera, a first plane equation in the camera coordinate system that conforms to the three-dimensional coordinates of the pixels; a first determining unit, configured for determining, according to a distance between an origin of the camera coordinate system and the ground surface, a setting height of the stereo camera; a second generating unit, configured for generating, according to the first plane equation, a plane normal vector corresponding to the first plane equation; and a second determining unit, configured for determining, according to the plane normal vector, a pitch angle of the stereo camera and an inclination angle of the stereo camera.

Preferably, the device further includes a filtering unit, configured for performing filtering processing on the ground surface data when the ground surface data does not meet a preset condition; wherein the filtering processing includes median filtering in time domain and median filtering in spatial domain.

Preferably, the first generating unit includes: a first selecting subunit, a first generating subunit, a first determining subunit, and a second generating subunit; wherein the first selecting subunit is configured for selecting at least three pixels from pixels in the ground surface data, and using three-dimensional coordinates of the at least three pixels in the camera coordinate system corresponding to the stereo camera as a first sample set; the first generating sub-unit is configured for generating, according to the first sample set, a second plane equation that conforms to three-dimensional coordinates of pixels in the first sample set in the camera coordinate system; the first determining subunit is configured for determining, among the pixels in the ground surface data, all pixels that meet the second plane equation, and using the three-dimensional coordinates of the pixels that meet the second plane equation in the camera coordinate system as a second sample set; and the second generating sub-unit is configured for generating, according to the second sample set, the first plane equation in the camera coordinate system that conforms to the three-dimensional coordinates of the pixels in the ground surface data in the camera coordinate system.

Preferably, the first selecting subunit is further configured for selecting at least three pixels from the pixels in the ground surface data by using a random sample consensus RANSAC algorithm.

Preferably, the first generating subunit includes: a second selecting subunit, a third generating subunit, a determining subunit, a second determining subunit, and a returning and performing subunit; wherein, the second selecting subunit is configured for selecting at least three pixels from the pixels in the ground surface data by using a RANSAC algorithm, and using the three-dimensional coordinates of the at least three pixels in the camera coordinate system corresponding to the stereo camera as the first sample set; the third generating subunit is configured for generating, according to the first sample set, a current plane equation that conforms to the three-dimensional coordinates of pixels in the first sample set in the camera coordinate system; the determining subunit is configured for determining whether the current plane equation satisfies a preset condition; the second determining subunit is configured for using the current plane equation as the second plane equation when the current plane equation satisfies the preset condition; the returning and performing subunit is configured for increasing the number of iterations by 1 when the current plane equation does not satisfy the preset condition and returning to perform the steps of selecting at least three pixels from pixels in the ground surface data, and using three-dimensional coordinates of the at least three pixels in the camera coordinate system corresponding to the stereo camera as a first sample set; wherein an initial value of the number of iterations is 0.

Preferably, the preset condition includes the number of pixels, among the pixels in the ground surface data, that meet the current plane equation reaches a preset first threshold, or the number of iterations corresponding to the current plane equation reaches a preset second threshold.

Preferably, the second generating subunit is specifically configured for performing fitting processing on the second sample set by using a least squares method to generate the first plane equation that conforms to the three-dimensional coordinates of the pixels in the ground surface data in the camera coordinate system.

Preferably, the second determining unit includes: a third determining subunit and a fourth determining subunit; wherein, the third determining subunit is configured for determining, in the camera coordinate system, a first angle by which a corresponding axis $z_c$ rotates about an axis x in a clockwise direction when the stereo camera rotates from a standard attitude to a current attitude, and using the first angle as the pitch angle of the stereo camera; and the fourth determining sub-unit is configured for determining, in the camera coordinate system, a second angle by which a corresponding axis $x_c$ rotates about an axis z in a clockwise direction when the stereo camera rotates from the standard attitude to the current attitude, and using the second angle as the inclination angle of the stereo camera; wherein a three-dimensional coordinate system defined by the axis $x_c$, the axis $z_c$, and an axis $y_c$ is the camera coordinate system; a three-dimensional coordinate system defined by the axis x, the axis z, and an axis y is a world coordinate system; when directions of the axis $x_c$ and the axis $z_c$ coincide with directions of the axis x and the axis z, and when direction of the axis $y_c$ is opposite to direction of the axis y, the stereo camera is in the standard attitude.

The method and device for determining external parameters of a stereo camera provided by the embodiments of the present application can determine, according to the ground surface data, a first plane equation in the camera coordinate system that conforms to the three-dimensional coordinates of each pixel in the ground surface data in the camera coordinate system, such that the first plane equation is applicable to each pixel in the ground surface data. The setting height of the stereo camera is determined according to the distance between the origin of the camera coordinate system and the ground surface. And finally, a plane normal vector is generated according to the first plane equation, and the pitch angle of the stereo camera and the inclination angle of the stereo camera is determined according to the plane normal vector. In this way, the external parameters of the stereo camera can be determined only by the acquired ground surface data without a reference point in the scene, which is suitable for most application scenarios, and avoids affecting the acquisition of external parameters due to the application scenario not meeting the requirements. The accuracy of the external parameters of the stereo camera is ensured, thereby ensuring the stereoscopic image obtained by the stereo camera.

BRIEF DESCRIPTION OF THE DRAWINGS

In order to illustrate the technical solutions in the embodiments of the present application or the prior art more clearly, the drawings to be used in the embodiments or the prior art description will be briefly described below. Obviously, the drawings in the following description are only for some embodiments of the application, other drawings may also be obtained by those of ordinary skill in the art without any creative efforts.

FIG. 4 is another flow chart of a method for determining external parameters of a stereo camera according to an embodiment of the present application.

FIG. 5 is a schematic diagram of determining external parameters of a stereo camera according to an embodiment of the present application.

DETAILED DESCRIPTION OF THE INVENTION

The technical solutions in the embodiments of the present application will be clearly and completely described in the following with reference to the drawings of the embodiments of the present application. It is obvious that the described embodiments are only a part of the embodiments of the present application, and not all of the embodiments. All other embodiments obtained by a person of ordinary skill in the art based on the embodiments of the present application without any creative efforts fall within the protection scope of the present application.

Method Embodiment 1

Figure 1:
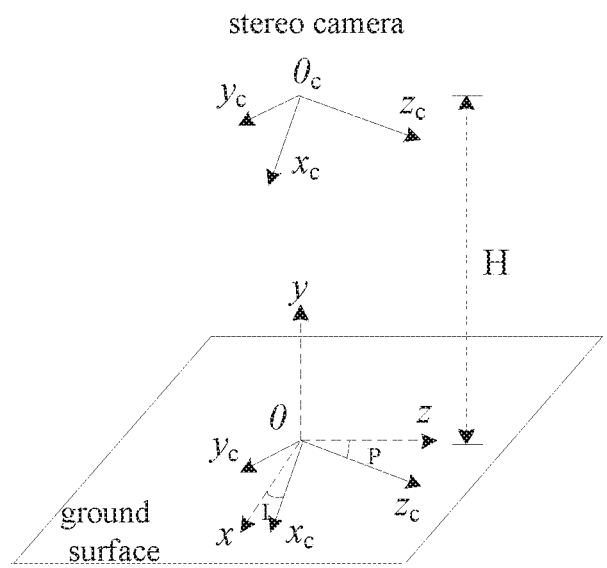
FIG. 1 is a schematic diagram of external parameters of a stereo camera.
Figure 2:
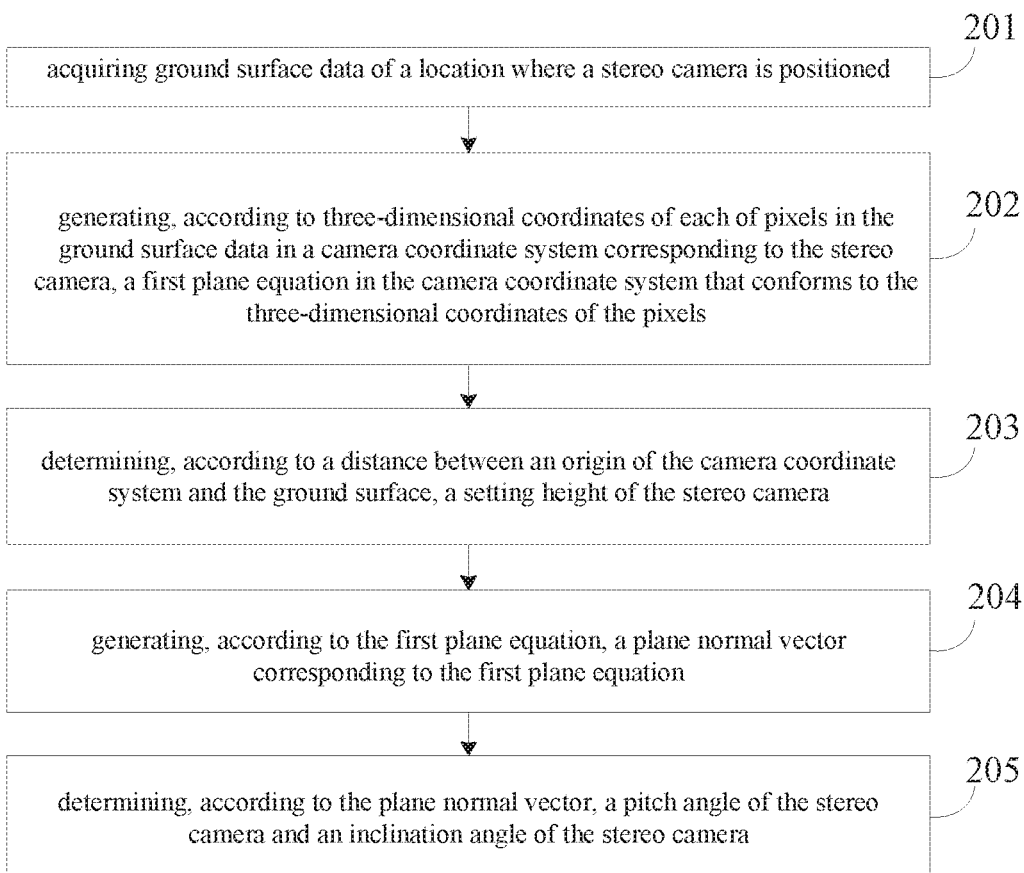
FIG. 2 is a flowchart of a method for determining external parameters of a stereo camera according to an embodiment of the present application.

The embodiment of the present application discloses a method for determining external parameters of a stereo camera. FIG. 2 is a flowchart of a method for determining external parameters of a stereo camera according to an embodiment of the present application. The method includes the following steps.

Step 201: acquiring ground surface data of a location where a stereo camera is positioned;

It should be noted that, the external parameters of the stereo camera determined according to the ground surface data of the location of the stereo camera can only be applied for capturing of the stereo camera at the current location. For example, if the stereo camera is currently located on hillside, the external parameters determined according to the ground surface data of the hillside can only be suitable for capturing of the stereo camera on hillside, and cannot be used for capturing of the stereo camera on plain; otherwise it will affect the capturing effect of the stereo camera.

In practical applications, a binocular camera can be used to generate a two-dimensional image and a disparity image of the ground surface, or a time-of-flight (TOF) depth camera can be used to generate a two-dimensional image and a depth image of the ground surface, to which the present application is not limited.

Specifically, when a binocular camera is used, the ground surface data may include a two-dimensional image and a disparity image of the ground surface, and the binocular camera may convert the two-dimensional coordinates of the two-dimensional image of the ground surface in the image coordinate system to three-dimensional coordinates in the camera coordinate system corresponding to the binocular camera based on the disparity image of the ground surface. The camera coordinate system herein is a three-dimensional coordinate system with the binocular camera as the origin. When a TOF depth camera is used, the ground surface data may include a two-dimensional image and a depth image of the ground surface, and the TOF depth camera can convert the two-dimensional coordinates of the two-dimensional image of the ground surface in the image coordinate system to three-dimensional coordinates in the camera coordinate system corresponding to the TOF depth camera based on the depth image of the ground surface. The camera coordinate system herein is a three-dimensional coordinate system with the TOF depth camera as the origin.

In an alternative embodiment of the present application, the method may further include:

performing filtering processing on the ground surface data when the ground surface data does not meet a preset condition; wherein the filtering processing includes median filtering in time domain and median filtering in spatial domain.

It should be noted that, due to different characteristics of the data acquired by different stereo cameras, the specific preset condition may vary depending on the type of the stereo camera, but the basic rule of the preset condition is related to noise threshold of the noise value in the ground surface data. If the noise in the ground surface data is large and exceeds the noise threshold, the ground surface data needs to be filtered; and if the noise in the ground surface data is small and does not exceed the noise threshold, the ground surface data need not be filtered.

In the median filtering in time domain, for a certain pixel in the image to be processed, the certain pixel in the image to be processed may be replaced by the average of the pixels in the same position in the continuous multi-frames before and after the image to be processed, and the same replacement process may be performed on all the pixels in the image to be processed. In the median filtering in spatial domain, for a certain pixel in the image to be processed, the certain pixel may be replaced by the average of a 3×3 pixel matrix around the certain pixel in the image to be processed, and the same replacement process may be performed on all the pixels in the image to be processed.

Specifically, in a case of an inaccuracy of disparity in a certain frame of image due to errors in a disparity calculation, the frame of image may be filtered by using the median filtering in time domain to improve the imaging quality of the certain frame of the image. In the case where the imaging quality of the image is poor since the disparity calculation cannot be performed on a special position in the feature scene, the image may be filtered by using the median filtering in spatial domain to improve the imaging quality of the image.

Of course, the filtering process on the ground surface data is not necessary. If the quality of the ground surface data conforms to the preset condition, the filtering process can be omitted.

Next, the two-dimensional coordinates of the two-dimensional image of the ground surface in the image coordinate system can be converted into three-dimensional coordinates in the camera coordinate system; but before that, it is also necessary to first determine the validity of the disparity image or the depth image in the ground surface data.

When the ground surface data includes the disparity image, it is necessary to determine whether the disparity image is valid, that is, whether the corresponding disparity value of each pixel of a plane image in the disparity image is within a reasonable range. For example, in a certain scene, the range from the closest distance to the farthest distance in the captured image is known, and the disparity values corresponding to the closest distance and the farthest distance are also known. If a certain disparity value in the disparity image exceeds the disparity values corresponding to the closest distance and farthest distance, then the certain disparity value in the disparity image is invalid. Such pixel in the plane image corresponding to the certain disparity value can be ignored, and the rest of the pixels in the plane image can be used for subsequent calculation.

When the ground surface data includes the depth image, it is necessary to determine whether the depth image is valid, that is, whether the corresponding depth value in the depth image of each pixel in the plane image is within a reasonable range. The specific determining method is similar to that for the disparity value, i.e. determining whether each depth value in the depth image is within a valid range. If a certain depth value exceeds the valid range, the certain depth value is invalid. Such certain depth in the plane image corresponding to the certain pixel may be ignored, and the rest of the pixels in the plane image can be used for subsequent calculation.

Step 202: generating, according to three-dimensional coordinates of each pixel in the ground surface data in a camera coordinate system corresponding to the stereo camera, a first plane equation in the camera coordinate system that conforms to the three-dimensional coordinates of the pixels.

Specifically, a plane equation to be determined can be preset, which contains multiple unknown parameters. Then the unknown parameters in the plane equation can be determined according to the three-dimensional coordinates of each pixel in the ground surface data in the camera coordinate system. Finally, the plane equation with the determined parameters is used as the first plane equation. In this way, the first plane equation can be consistency with the distribution of pixels in the ground surface data to the greatest extent, and ensure the accuracy of the obtained external parameters of the stereo camera.

Step 203: determining, according to a distance between the origin of the camera coordinate system and the ground surface, a setting height of the stereo camera.

Since the origin in the camera coordinate system corresponding to a stereo camera is the stereo camera, the distance between the origin and the ground surface in the camera coordinate system can be calculated, and the distance is determined as the setting height of the stereo camera; wherein the setting height of the stereo camera is one of three external parameters of the stereo camera.

Step 204: determining, according to the first plane equation, a plane normal vector corresponding to the first plane equation.

This step can be realized by the same method as the related art, and the plane normal vector corresponding to the first plane equation can be calculated according to the first plane equation obtained in step 203, so as to calculate the pitch angle and the inclination angle of the stereo camera.

Step 205: determining, according to the plane normal vector, a pitch angle of the stereo camera and an inclination angle of the stereo camera.

Specifically, in another optional embodiment of the present application, step 205 may specifically include:

determining, in the camera coordinate system, a first angle by which the corresponding axis $z_c$ rotates about the axis x in a clockwise direction when the stereo camera rotates from a standard attitude to a current attitude, and using the first angle as the pitch angle of the stereo camera; and determining, in the camera coordinate system, a second angle by which the corresponding axis $x_c$ rotates about the axis z in a clockwise direction when the stereo camera rotates from the standard attitude to the current attitude, and using the second angle as the inclination angle of the stereo camera;

wherein the three-dimensional coordinate system defined by the axis $x_c$, the axis $z_c$, and the axis $y_c$ is the camera coordinate system; the three-dimensional coordinate system defined by the axis x, the axis z, and the axis y is a world coordinate system; when the directions of the axis $x_c$ and the axis $z_c$ coincide with the directions of the axis x and the axis z and when the direction of the axis $y_c$ is opposite to the direction of the axis y, the stereo camera is in the standard attitude.

By applying the embodiments of the present application, a first plane equation can be determined according to the three-dimensional coordinates of each pixel in the ground surface data in the camera coordinate system, wherein the first plane equation can represent the distribution of all the pixels in the ground surface data; then the setting height of the stereo camera is determined according to the distance between the origin of the camera coordinate system and the ground surface, and a plane normal vector of the first plane equation is generated; and the pitch angle of the stereo camera and the inclination angle of the stereo camera are determined according to the plane normal vector. In this way, the external parameters of the stereo camera can be determined based only on the acquired ground surface data without a reference point in the scene, which is suitable for most application scenarios, and avoids affecting the acquisition of external parameters due to the application scenario not meeting the requirements. The accuracy of the external parameters of the stereo camera is ensured.

Method Embodiment 2

Figure 3:
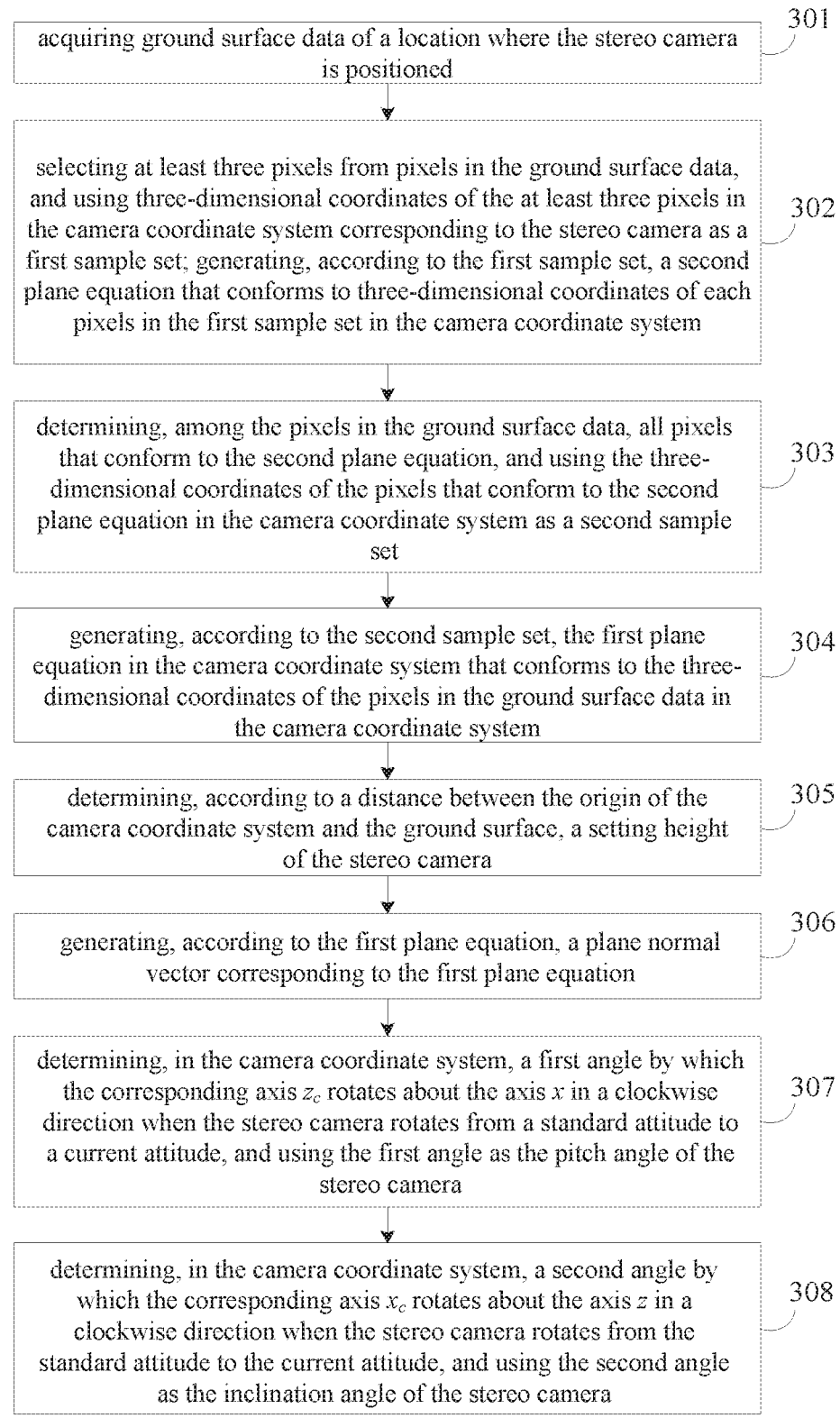
FIG. 3 is another flowchart of a method for determining external parameters of a stereo camera according to an embodiment of the present application.

FIG. 3 is another flowchart of a method for determining external parameters of a stereo camera according to an embodiment of the present application. The method includes the following steps.

Step 301: acquiring ground surface data of a location where the stereo camera is positioned.

Step 302: selecting at least three pixels from pixels in the ground surface data, and using three-dimensional coordinates of the at least three pixels in the camera coordinate system corresponding to the stereo camera as a first sample set; generating, according to the first sample set, a second plane equation that conforms to three-dimensional coordinates of each pixels in the first sample set in the camera coordinate system.

Specifically, the second plane equation can be preset as shown in the equation (1):

$$a'x+b'y+c'z+d'=0 \quad (1)$$

Next, the equation (1) is solved by substituting the three-dimensional coordinates of the three pixels to obtain a, b', c' and d'.

In a preferred embodiment of the present application, as shown in FIG. 4, FIG. 4 is another flowchart of a method for determining external parameters of a stereo camera in the embodiment of the present application, where the step 303 may specifically include the following sub-steps.

Substep 11, selecting at least three pixels from the pixels in the ground surface data by using a RANSAC (RANdom SAmple Consensus) algorithm, and using the three-dimensional coordinates of the at least three pixels in the camera coordinate system corresponding to the stereo camera as the first sample set.

Of course, other algorithms may also be used to select at least three pixels from the pixels of the ground surface data. The specific method for selecting at least three pixels from the ground surface data is not limited in the present application.

Substep 12, generating, according to the first sample set, a current plane equation that conforms to the three-dimensional coordinates of pixels in the first sample set in the camera coordinate system.

Substep 13, determining whether the current plane equation satisfies a preset condition.

Substep 14, when the current plane equation satisfies the preset condition, determining the current plane equation as the second plane equation.

Substep 15, when the current plane equation does not satisfy the preset condition, increasing the number of iterations by 1, and returning to substep 11.

Wherein the initial value of the number of iterations is 0.

In a further preferred embodiment of the present application, the preset condition may specifically include:

the number of the pixels among the pixels in the ground surface data that meet the current plane equation reaches a preset first threshold, or the number of iterations for the current plane equation reaches a preset second threshold.

For example, the first threshold may be the specific number of pixels in the ground surface data that conform to the current plane equation, or may be the percentage of the number of pixels in the ground surface data that conform to the current plane equation with respect to the total number of pixels in the ground surface data. The first threshold and the second threshold may be set according to actual conditions; the specific expression of the first threshold is not limited in the present application.

Step 303: determining, among the pixels in the ground surface data, all pixels that conform to the second plane equation, and using the three-dimensional coordinates of the pixels that conform to the second plane equation in the camera coordinate system as a second sample set.

Specifically, the pixels that conform to the second plane equation (1) determined in step 302 are selected from all pixels in the ground surface data, and the three-dimensional coordinates of these pixels are used as a second sample set.

Step 304: generating, according to the second sample set, the first plane equation in the camera coordinate system that conforms to the three-dimensional coordinates of the pixels in the ground surface data in the camera coordinate system.

In another preferred embodiment of the present application, the step 305 may specifically include:

performing fitting processing on the second sample set by using a least squares method to generate the first plane equation that conforms to the three-dimensional coordinates of the pixels in the ground surface data in the camera coordinate system.

The following is an example of the specific process of generating the first plane equation.

First step: It is known that there are n pixels in the second sample set, and the three-dimensional coordinates are $(x_1, y_1, z_1)$, $(x_2, y_2, z_2)$, ..., $(x_n, y_n, z_n)$. At the same time, the first plane equation can be preset as shown in equation (2):

$$ax+by+cz+d=0 \quad (2)$$

The equation (2) is divided by d to obtain the modified first plane equation, as shown in equation (3):

$$\overline{a}x+\overline{b}y+\overline{c}z+1=0 \quad (3)$$

wherein, in the equation (3), $\overline{a}=a/d\cdot$, $\overline{b}=b/d=$, $\overline{c}=c/d$.

The three-dimensional coordinates corresponding to the ii pixels in the second sample set are brought into the modified first plane equation, as shown in formula (3):

$$\begin{cases} \overline{a}x_1 + \overline{b}y_1 + \overline{c}z_1 + 1 = 0 \\ \overline{a}x_2 + \overline{b}y_2 + \overline{c}z_2 + 1 = 0 \\ \vdots \\ \overline{a}x_n + \overline{b}y_n + \overline{c}z_n + 1 = 0 \end{cases} \quad (4)$$

wherein in the equation (4), $\overline{a}=a/d$, $\overline{b}=b/d$, $\overline{c}=c/d$; wherein the formulas in equation (4) can be written as a matrix, as shown in equation (5):

$$AX=B \quad (5)$$

In the equation (5), the matrix A is an N×3 matrix defined by all three-dimensional points, the matrix X is a 1×3 matrix defined by $\overline{a}$, $\overline{b}$ and $\overline{c}$, and the matrix B [−1; −1; −1 ].

The second step: solving the equation (5) by using the least squares method, and the following equation (6) is obtained:

$$X=(A^TA)^{-1}A^Tb \quad (6)$$

In equation (6), X is the least squares solution of equation (5); the matrix $A^T$ is the transposed matrix of matrix A, and the matrix $(A^TA)^{-1}$ is the inverse matrix of the matrix $A^TA$, $(A^TA)^{-1}A^T$ is the pseudo inverse matrix of the matrix A.

Third step: since the matrix X solved by the equation (6) is an 1×3 matrix defined by $\overline{a}$, $\overline{b}$ and $\overline{c}$, the matrix X can be used to determine the value of $\overline{a}$, $\overline{b}$ and $\overline{c}$ in the modified first plane equation in the formula (3), and in turn the a, b, c, and d in the first plane equation in equation (2) can be calculated, and finally the specific form of the first plane equation can be obtained.

Step 305, determining, according to a distance between the origin of the camera coordinate system and the ground surface, a setting height of the stereo camera.

Step 306, generating, according to the first plane equation, a plane normal vector corresponding to the first plane equation.

Step 307, determining, in the camera coordinate system, a first angle by which the corresponding axis $z_c$ rotates about the axis x in a clockwise direction when the stereo camera rotates from a standard attitude to a current attitude, and using the first angle as the pitch angle of the stereo camera.

Step 308, determining, in the camera coordinate system, a second angle by which the corresponding axis $x_c$ rotates about the axis z in a clockwise direction when the stereo camera rotates from the standard attitude to the current attitude, and using the second angle as the inclination angle of the stereo camera.

The specific process of calculating the three external parameters of the stereo camera is described below.

FIG. 5 is a schematic diagram of determining external parameters of a stereo camera. In FIG. 5, the three-dimensional coordinate system defined by the axis $x_c$, the axis $z_c$, and the axis $y_c$ in the upper part of the figure is the camera coordinate system corresponding to the stereo camera, and the stereo camera is the origin of the camera coordinate system, with reference number $0_c$; the three-dimensional coordinate system defined by the axis x, the axis z, and the axis y, which is indicated by the dotted line on the ground plane, is a world coordinate system with the origin of 0. The camera coordinate system is translated to the ground plane, such that the origin $0_c$ of the camera coordinate system coincides with the origin 0 of the world coordinate system. $\vec{n}$ is the plane normal vector $\vec{n}=(\vec{a},\vec{b},\vec{c})$ corresponding to the first plane equation, which is calculated in step 305, wherein there are two possible direction of the plane normal vector $\vec{n}$, which is the direction indicated in FIG. 5, or the direction opposite to the direction indicated in FIG. 5. In FIG. 5, the height H is the setting height of the stereo camera, the angle P is the pitch angle of the stereo camera, and the angle I is the inclination angle of the stereo camera. Specifically, the pitch angle P is the angle by which the axis $z_c$ will rotate about the axis x in a clockwise direction when the stereo camera rotates from the standard attitude to the current attitude as shown in FIG. 5. The inclination angle I is the angle by which the axis $x_c$ will rotate about the axis z in a clockwise direction when the stereo camera rotates from the standard attitude to the current attitude as shown in FIG. 5. The standard attitude is an attitude of the stereo camera in which the directions of the axis $x_c$ and the axis $z_c$ in the camera coordinate system coincide with the directions of the axis x and the axis z in the world coordinate system and the direction of the axis $y_c$ in the camera coordinate system is opposite to the direction of the axis y in the world coordinate system. It can be understood that when the stereo camera is in the standard attitude, the pitch angle P and the inclination angle I are both 0.

First, as shown in FIG. 5, the expression of the distance between the origin in the camera coordinate system and the ground surface is as shown in the equation (7), $$H = \frac{|ax_1 + by_1 + cz_1 + d|}{\sqrt{a^2+b^2+c^2}} \quad (7)$$

In equation (7), H is the setting height of the stereo camera, a, b, c, and d are the parameters in the first plane equation, and $x_1$, $y_1$ and $z_1$ are the coordinates of the origin in the camera coordinate system, that is, $x_1=0$, $y_1=0$ and $z_1=0$.

Next, the state of the stereo camera can be determined by the positive and negative of the components of the plane normal vector on the axis $\vec{n}$ and the axis $z_c$, and then the pitch angle of the stereo camera is solved, and the calculation equations are as shown in the equations (8) to (12):

when $\overline{b}\geq0, \overline{c}\geq0$, $$P=(90-\arccos(\overline{c}))' \quad (8)$$

when $\overline{b}\geq0, \overline{c}<0$, $$P=(90-\arccos(-\overline{c}))' \quad (9)$$

when $\overline{b}<0, \overline{c}\geq0$, $$P=(90+\arccos(\overline{c}))' \quad (10)$$

when $\overline{b}<0, \overline{c}<0$, $$P=(90-\arccos(-\overline{c}))' \quad (11)$$

In the equations (8) to (11), $$\bar{b}' = \frac{b}{\sqrt{a^2 + b^2 + c^2}}, \bar{c}' = \frac{c}{\sqrt{a^2 + b^2 + c^2}},$$

and c are the parameters in the first plane equation.

Finally, the calculation equations for solving the inclination angle I of the stereo camera are as shown in equation (12) and equation (13):

when $\bar{c} \geq 0$, $$I = \arccos(-\bar{a}) - 90 \quad (12)$$

when $\bar{c} < 0$, $$I = \arccos(\bar{a}) - 90 \quad (13)$$

in equation (12) and equation (13), $$\bar{a}' = \frac{a}{\sqrt{a^2 + b^2 + c^2}}, \bar{c}' = \frac{c}{\sqrt{a^2 + b^2 + c^2}},$$

a, b and c are the parameters in the first plane equation.

In this way, it can determine three external parameters corresponding to the stereo camera, so that the stereo camera can obtain high-quality stereoscopic images.

It can be seen that, by applying the embodiments of the present application, the second plane equation can be generated through multiple calculation iterations according to the three-dimensional coordinates of each pixel in the ground surface data in the camera coordinate system. Then, all the pixels of the ground surface data that conform to the second plane equation are determined, the least squares calculation is performed on these pixels, and the first plane equation which can represent the distribution pattern of all the pixels in the ground surface data can be obtained. In turn, the external parameters of the stereo camera can be determined according to the plane normal vector and the origin of the camera coordinate system. In this way, the method for determining external parameters of a stereo camera by ground surface data can be applied to most application scenarios, and is not only convenient but also ensures that the obtained external parameters are accurate and reliable.

Device Embodiment 1

Figure 6:
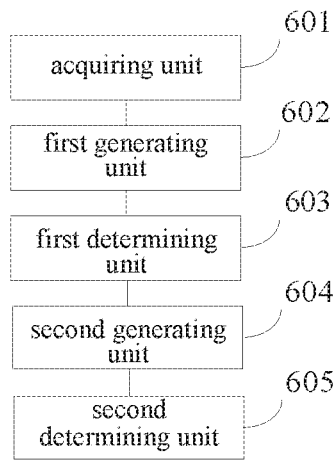
FIG. 6 is a structural diagram of a device for determining external parameters of a stereo camera according to an embodiment of the present application.

Referring to FIG. 6, FIG. 6 is a structural diagram of a device for determining external parameters of a stereo camera according to an embodiment of the present application. The device corresponds to the method flow shown in FIG. 2, and specifically includes the following units:

an acquiring unit 601, configured for acquiring ground surface data of a location where the stereo camera is positioned;

a first generating unit 602, configured for generating, according to three-dimensional coordinates of each of pixels in the ground surface data in a camera coordinate system corresponding to the stereo camera, a first plane equation in the camera coordinate system that conforms to the three-dimensional coordinates of the pixels;

a first determining unit 603, configured for determining, according to a distance between an origin of the camera coordinate system and the ground surface, a setting height of the stereo camera;

a second generating unit 604, configured for generating, according to the first plane equation, a plane normal vector corresponding to the first plane equation; and a second determining unit 605, configured for determining, according to the plane normal vector, a pitch angle of the stereo camera and an inclination angle of the stereo camera.

In a preferred embodiment of the present application, the device further includes:

a filtering unit, configured for performing filtering processing on the ground surface data when the ground surface data does not meet a preset condition; wherein the filtering processing comprises median filtering in time domain and median filtering in spatial domain.

The device embodiment of the present application can determine a first plane equation according to the ground surface data and the three-dimensional coordinates of each pixel in the ground surface data in the camera coordinate system, wherein the first plane equation can represent the distribution pattern of all the pixels in the ground surface data. Then the setting height of the stereo camera is determined according to the distance between the origin of the camera coordinate system and the ground surface, and a plane normal vector of the first plane equation is generated. Finally, the pitch angle of the stereo camera and the inclination angle of the stereo camera are determined according to the plane normal vector. In this way, the external parameters of the stereo camera can be determined only by the acquired ground surface data without a reference point in the scene, which is suitable for most application scenarios, and avoids affecting the acquisition of external parameters due to the application scenario not meeting the requirements. The accuracy of the external parameters of the stereo camera is ensured.

Device Embodiment 2

Figure 7:
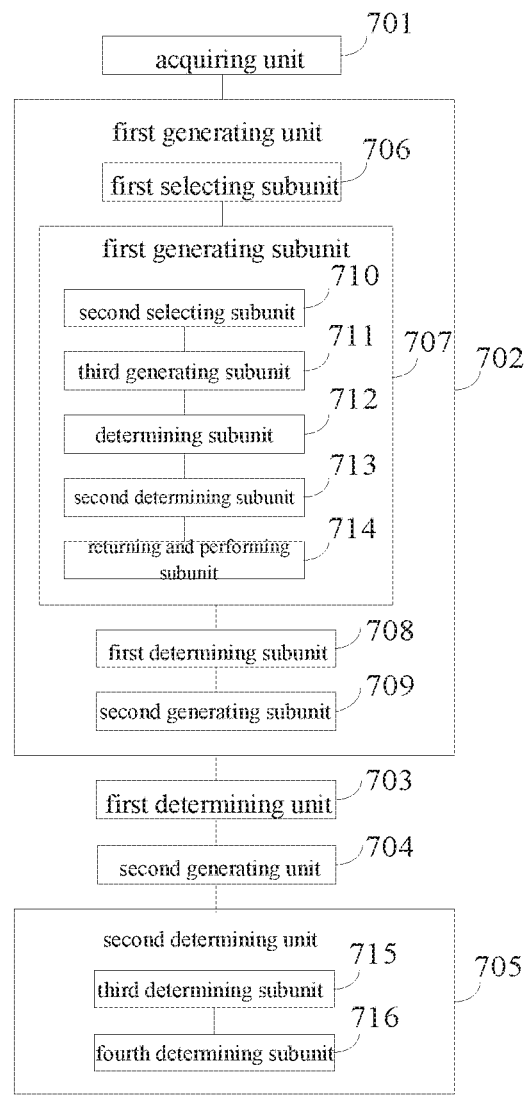
FIG. 7 is another structural diagram of a device for determining external parameters of a stereo camera according to an embodiment of the present application.

Referring to FIG. 7, FIG. 7 is another structural diagram of a device for determining external parameters of a stereo camera according to an embodiment of the present application. The device corresponds to the method flow shown in FIG. 3, and the device includes: an acquiring unit 701, and a first generating unit 702, the first determining unit 703, the second generating unit 704, and the second determining unit 705; wherein the acquiring unit 701 may be identical to the obtaining unit 601 shown in FIG. 6, the first determining unit 703 may be identical to the first determining unit 603 shown in FIG. 6, and the second generating unit 704 may be identical to the second generating unit 604 shown in FIG. 6, therefore details are not described herein again.

The first generating unit 702 specifically includes a first selecting subunit 706, a first generating subunit 707, a first determining subunit 708, and a second generating subunit 709; wherein, the first selecting subunit 706 is configured for selecting at least three pixels from pixels in the ground surface data, and using three-dimensional coordinates of the at least three pixels in the camera coordinate system corresponding to the stereo camera as a first sample set;

the first generating sub-unit 707 is configured for generating, according to the first sample set, a second plane equation that conforms to three-dimensional coordinates of pixels in the first sample set in the camera coordinate system;

the first determining subunit 708 is configured for determining, among the pixels in the ground surface data, all pixels that meet the second plane equation, and using the three-dimensional coordinates of the pixels that meet the second plane equation in the camera coordinate system as a second sample set; and the second generating sub-unit 709 is configured for generating, according to the second sample set, the first plane equation in the camera coordinate system that conforms to the three-dimensional coordinates of the pixels in the ground surface data in the camera coordinate system.

In a preferred embodiment of the present application, the first selecting subunit 706 is specifically configured for selecting at least three pixels from the pixels in the ground surface data by using a random sample consensus RANSAC algorithm.

In still another preferred embodiment of the present application, the first generating subunit 707 specifically includes: a second selecting subunit 710, a third generating subunit 711, a determining subunit 712, a second determining subunit 713, and a returning and performing subunit 714; wherein, the second selecting subunit 710 is for selecting at least three pixels from the pixels in the ground surface data by using a RANSAC algorithm, and using the three-dimensional coordinates of the at least three pixels in the camera coordinate system corresponding to the stereo camera as the first sample set;

the third generating subunit 711 is configured for generating, according to the first sample set, a current plane equation that conforms to the three-dimensional coordinates of pixels in the first sample set in the camera coordinate system;

the determining subunit 712 is configured for determining whether the current plane equation satisfies a preset condition;

the second determining subunit 713 is configured for using the current plane equation as the second plane equation when the current plane equation satisfies the preset condition;

the returning and performing subunit 714 is configured for increasing the number of iterations by 1 when the current plane equation does not satisfy the preset condition and returning to perform the steps of selecting at least three pixels from pixels in the ground surface data, and using three-dimensional coordinates of the at least three pixels in the camera coordinate system corresponding to the stereo camera as a first sample set; wherein an initial value of the number of iterations is 0.

In another preferred embodiment of the present application, the preset condition includes the number of pixels, among the pixels in the ground surface data, that meet the current plane equation reaches a preset first threshold, or the number of iterations corresponding to the current plane equation reaches a preset second threshold.

In yet another preferred embodiment of the present application, the second generating subunit 709 is specifically configured for performing fitting processing on the second sample set by using a least squares method to generate the first plane equation that conforms to the three-dimensional coordinates of the pixels in the ground surface data in the camera coordinate system.

In yet another preferred embodiment of the present application, the second determining unit 705 includes a third determining subunit 715 and a fourth determining subunit 716;

wherein the third determining subunit 715 is configured for determining, in the camera coordinate system, a first angle by which a corresponding axis $z_c$ rotates about an axis x in a clockwise direction when the stereo camera rotates from a standard attitude to a current attitude, and using the first angle as the pitch angle of the stereo camera;

the fourth determining sub-unit 716 is configured for determining, in the camera coordinate system, a second angle by which a corresponding axis $x_c$ rotates about an axis z in a clockwise direction when the stereo camera rotates from the standard attitude to the current attitude, and using the second angle as the inclination angle of the stereo camera;

wherein a three-dimensional coordinate system defined by the axis $x_c$, the axis $z_c$, and an axis $y_c$ is the camera coordinate system; a three-dimensional coordinate system defined by the axis x, the axis z, and an axis y is a world coordinate system; when directions of the axis $x_c$ and the axis $z_c$ coincide with directions of the axis x and the axis z, and when direction of the axis $y_c$ is opposite to direction of the axis y, the stereo camera is in the standard attitude.

It can be seen that, in the device embodiments of the present application, the second plane equation can be generated through multiple calculation iterations according to the three-dimensional coordinates of each pixel in the ground surface data in the camera coordinate system. Then, all the pixels of the ground surface data that conform to the second plane equation are determined, the least squares calculation is performed on these pixels, and the first plane equation which can represent the distribution pattern of all the pixels in the ground surface data can be obtained. In turn, the external parameters of the stereo camera can be determined according to the plane normal vector and the origin of the camera coordinate system. In this way, the method for determining external parameters of a stereo camera by ground surface data can be applied to most application scenarios, and is not only convenient but also ensures that the obtained external parameters are accurate and reliable.

An embodiment of the present application also discloses a storage medium, configured to store executable program codes. The executable program codes, when being executed, are used to implement a method for determining external parameters of a stereo camera. The method includes the following steps:

acquiring ground surface data of a location where the stereo camera is positioned;

generating, according to three-dimensional coordinates of each of pixels in the ground surface data in a camera coordinate system corresponding to the stereo camera, a first plane equation in the camera coordinate system that conforms to the three-dimensional coordinates of the pixels;

determining, according to a distance between an origin of the camera coordinate system and the ground surface, a setting height of the stereo camera;

generating, according to the first plane equation, a plane normal vector corresponding to the first plane equation; and determining, according to the plane normal vector, a pitch angle of the stereo camera and an inclination angle of the stereo camera.

Preferably, the method further includes: performing filtering processing on the ground surface data when the ground surface data does not meet a preset condition; wherein the filtering processing comprises median filtering in time domain and median filtering in spatial domain.

Preferably, generating, according to three-dimensional coordinates of each of pixels in the ground surface data in a camera coordinate system corresponding to the stereo camera, a first plane equation in the camera coordinate system that conforms to the three-dimensional coordinates of the pixels includes:

selecting at least three pixels from pixels in the ground surface data, and using three-dimensional coordinates of the at least three pixels in the camera coordinate system corresponding to the stereo camera as a first sample set;

generating, according to the first sample set, a second plane equation that conforms to three-dimensional coordinates of pixels in the first sample set in the camera coordinate system;

determining, among the pixels in the ground surface data, all pixels that meet the second plane equation, and using the three-dimensional coordinates of the pixels that meet the second plane equation in the camera coordinate system as a second sample set; and generating, according to the second sample set, the first plane equation in the camera coordinate system that conforms to the three-dimensional coordinates of the pixels in the ground surface data in the camera coordinate system.

Preferably, selecting at least three pixels from pixels in the ground surface data includes: selecting at least three pixels from the pixels in the ground surface data by using a random sample consensus RANSAC algorithm.

Preferably, selecting at least three pixels from pixels in the ground surface data, and using three-dimensional coordinates of the at least three pixels in the camera coordinate system corresponding to the stereo camera as a first sample set and generating, according to the first sample set, a second plane equation that conforms to three-dimensional coordinates of pixels in the first sample set in the camera coordinate system includes:

selecting at least three pixels from the pixels in the ground surface data by using a RANSAC algorithm, and using the three-dimensional coordinates of the at least three pixels in the camera coordinate system corresponding to the stereo camera as the first sample set;

generating, according to the first sample set, a current plane equation that conforms to the three-dimensional coordinates of pixels in the first sample set in the camera coordinate system;

determining whether the current plane equation satisfies a preset condition;

using the current plane equation as the second plane equation when the current plane equation satisfies the preset condition;

increasing the number of iterations by 1 when the current plane equation does not satisfy the preset condition and returning to perform the steps of selecting at least three pixels from pixels in the ground surface data, and using three-dimensional coordinates of the at least three pixels in the camera coordinate system corresponding to the stereo camera as a first sample set; wherein an initial value of the number of iterations is 0.

Preferably, the preset condition includes: the number of pixels, among the pixels in the ground surface data, that meet the current plane equation reaches a preset first threshold, or the number of iterations corresponding to the current plane equation reaches a preset second threshold.

Preferably, generating, according to the second sample set, the first plane equation in the camera coordinate system that conforms to the three-dimensional coordinates of the pixels in the ground surface data in the camera coordinate system includes:

performing fitting processing on the second sample set by using a least squares method to generate the first plane equation that conforms to the three-dimensional coordinates of the pixels in the ground surface data in the camera coordinate system.

Preferably, determining, according to the plane normal vector, a pitch angle of the stereo camera and an inclination angle of the stereo camera includes:

determining, in the camera coordinate system, a first angle by which a corresponding axis $z_c$ rotates about an axis x in a clockwise direction when the stereo camera rotates from a standard attitude to a current attitude, and using the first angle as the pitch angle of the stereo camera; and determining, in the camera coordinate system, a second angle by which a corresponding axis $x_c$ rotates about an axis z in a clockwise direction when the stereo camera rotates from the standard attitude to the current attitude, and using the second angle as the inclination angle of the stereo camera;

wherein a three-dimensional coordinate system defined by the axis $x_c$, the axis $z_c$, and an axis $y_c$ is the camera coordinate system; a three-dimensional coordinate system defined by the axis x, the axis z, and an axis y is a world coordinate system; when directions of the axis $x_c$ and the axis $z_c$ coincide with directions of the axis x and the axis z, and when direction of the axis $y_c$ is opposite to direction of the axis y, the stereo camera is in the standard attitude.

It can be seen that, in the storage medium embodiment of the present application, the second plane equation can be generated through multiple calculation iterations according to the three-dimensional coordinates of each pixel in the ground surface data in the camera coordinate system. Then, all the pixels of the ground surface data that conform to the second plane equation are determined, the least squares calculation is performed on these pixels, and the first plane equation which can represent the distribution pattern of all the pixels in the ground surface data can be obtained. In turn, the external parameters of the stereo camera can be determined according to the plane normal vector and the origin of the camera coordinate system. In this way, the method for determining external parameters of a stereo camera by ground surface data can be applied to most application scenarios, and is not only convenient but also ensures that the obtained external parameters are accurate and reliable.

An embodiment of the present application also discloses an application program, configured to implement a method for determining external parameters of a stereo camera. The method includes the following steps:

acquiring ground surface data of a location where the stereo camera is positioned;

generating, according to three-dimensional coordinates of each of pixels in the ground surface data in a camera coordinate system corresponding to the stereo camera, a first plane equation in the camera coordinate system that conforms to the three-dimensional coordinates of the pixels;

determining, according to a distance between an origin of the camera coordinate system and the ground surface, a setting height of the stereo camera;

generating, according to the first plane equation, a plane normal vector corresponding to the first plane equation; and determining, according to the plane normal vector, a pitch angle of the stereo camera and an inclination angle of the stereo camera.

Preferably, the method further includes: performing filtering processing on the ground surface data when the ground surface data does not meet a preset condition; wherein the filtering processing comprises median filtering in time domain and median filtering in spatial domain.

Preferably, generating, according to three-dimensional coordinates of each of pixels in the ground surface data in a camera coordinate system corresponding to the stereo camera, a first plane equation in the camera coordinate system that conforms to the three-dimensional coordinates of the pixels includes:

selecting at least three pixels from pixels in the ground surface data, and using three-dimensional coordinates of the at least three pixels in the camera coordinate system corresponding to the stereo camera as a first sample set;

generating, according to the first sample set, a second plane equation that conforms to three-dimensional coordinates of pixels in the first sample set in the camera coordinate system;

determining, among the pixels in the ground surface data, all pixels that meet the second plane equation, and using the three-dimensional coordinates of the pixels that meet the second plane equation in the camera coordinate system as a second sample set; and generating, according to the second sample set, the first plane equation in the camera coordinate system that conforms to the three-dimensional coordinates of the pixels in the ground surface data in the camera coordinate system.

Preferably, selecting at least three pixels from pixels in the ground surface data includes: selecting at least three pixels from the pixels in the ground surface data by using a random sample consensus RANSAC algorithm.

Preferably, selecting at least three pixels from pixels in the ground surface data, and using three-dimensional coordinates of the at least three pixels in the camera coordinate system corresponding to the stereo camera as a first sample set and generating, according to the first sample set, a second plane equation that conforms to three-dimensional coordinates of pixels in the first sample set in the camera coordinate system includes:

selecting at least three pixels from the pixels in the ground surface data by using a RANSAC algorithm, and using the three-dimensional coordinates of the at least three pixels in the camera coordinate system corresponding to the stereo camera as the first sample set;

generating, according to the first sample set, a current plane equation that conforms to the three-dimensional coordinates of pixels in the first sample set in the camera coordinate system;

determining whether the current plane equation satisfies a preset condition;

using the current plane equation as the second plane equation when the current plane equation satisfies the preset condition;

increasing the number of iterations by 1 when the current plane equation does not satisfy the preset condition and returning to perform the steps of selecting at least three pixels from pixels in the ground surface data, and using three-dimensional coordinates of the at least three pixels in the camera coordinate system corresponding to the stereo camera as a first sample set; wherein an initial value of the number of iterations is 0.

Preferably, the preset condition includes: the number of pixels, among the pixels in the ground surface data, that meet the current plane equation reaches a preset first threshold, or the number of iterations corresponding to the current plane equation reaches a preset second threshold.

Preferably, generating, according to the second sample set, the first plane equation in the camera coordinate system that conforms to the three-dimensional coordinates of the pixels in the ground surface data in the camera coordinate system includes:

performing fitting processing on the second sample set by using a least squares method to generate the first plane equation that conforms to the three-dimensional coordinates of the pixels in the ground surface data in the camera coordinate system.

Preferably, determining, according to the plane normal vector, a pitch angle of the stereo camera and an inclination angle of the stereo camera includes:

determining, in the camera coordinate system, a first angle by which a corresponding axis $z_c$ rotates about an axis x in a clockwise direction when the stereo camera rotates from a standard attitude to a current attitude, and using the first angle as the pitch angle of the stereo camera; and determining, in the camera coordinate system, a second angle by which a corresponding axis $x_c$ rotates about an axis z in a clockwise direction when the stereo camera rotates from the standard attitude to the current attitude, and using the second angle as the inclination angle of the stereo camera;

wherein a three-dimensional coordinate system defined by the axis $x_c$, the axis $z_c$, and an axis $y_c$ is the camera coordinate system; a three-dimensional coordinate system defined by the axis x, the axis z, and an axis y is a world coordinate system; when directions of the axis $x_c$ and the axis $z_c$ coincide with directions of the axis x and the axis z, and when direction of the axis $y_c$ is opposite to direction of the axis y, the stereo camera is in the standard attitude.

It can be seen that, in the application program embodiment of the present application, the second plane equation can be generated through multiple calculation iterations according to the three-dimensional coordinates of each pixel in the ground surface data in the camera coordinate system. Then, all the pixels of the ground surface data that conform to the second plane equation are determined, the least squares calculation is performed on these pixels, and the first plane equation which can represent the distribution pattern of all the pixels in the ground surface data can be obtained. In turn, the external parameters of the stereo camera can be determined according to the plane normal vector and the origin of the camera coordinate system. In this way, the method for determining external parameters of a stereo camera by ground surface data can be applied to most application scenarios, and is not only convenient but also ensures that the obtained external parameters are accurate and reliable.

An embodiment of the present application also provides an electronic device including a controller, a communication interface, a memory, and a communication bus; wherein the controller, the communication interface, and the memory communicates with each other via the communication bus;

the memory is configured to store executable program codes;

the controller is configured to read the executable program codes stored in the memory to execute an program corresponding to the executable program codes, so as to implement the method for determining external parameters of a stereo camera, which method includes the following steps:

acquiring ground surface data of a location where the stereo camera is positioned;

generating, according to three-dimensional coordinates of each of pixels in the ground surface data in a camera coordinate system corresponding to the stereo camera, a first plane equation in the camera coordinate system that conforms to the three-dimensional coordinates of the pixels;

determining, according to a distance between an origin of the camera coordinate system and the ground surface, a setting height of the stereo camera;

generating, according to the first plane equation, a plane normal vector corresponding to the first plane equation; and determining, according to the plane normal vector, a pitch angle of the stereo camera and an inclination angle of the stereo camera.

Preferably, the method further includes: performing filtering processing on the ground surface data when the ground surface data does not meet a preset condition; wherein the filtering processing comprises median filtering in time domain and median filtering in spatial domain.

Preferably, generating, according to three-dimensional coordinates of each of pixels in the ground surface data in a camera coordinate system corresponding to the stereo camera, a first plane equation in the camera coordinate system that conforms to the three-dimensional coordinates of the pixels includes:

selecting at least three pixels from pixels in the ground surface data, and using three-dimensional coordinates of the at least three pixels in the camera coordinate system corresponding to the stereo camera as a first sample set;

generating, according to the first sample set, a second plane equation that conforms to three-dimensional coordinates of pixels in the first sample set in the camera coordinate system;

determining, among the pixels in the ground surface data, all pixels that meet the second plane equation, and using the three-dimensional coordinates of the pixels that meet the second plane equation in the camera coordinate system as a second sample set; and generating, according to the second sample set, the first plane equation in the camera coordinate system that conforms to the three-dimensional coordinates of the pixels in the ground surface data in the camera coordinate system.

Preferably, selecting at least three pixels from pixels in the ground surface data includes: selecting at least three pixels from the pixels in the ground surface data by using a random sample consensus RANSAC algorithm.

Preferably, selecting at least three pixels from pixels in the ground surface data, and using three-dimensional coordinates of the at least three pixels in the camera coordinate system corresponding to the stereo camera as a first sample set and generating, according to the first sample set, a second plane equation that conforms to three-dimensional coordinates of pixels in the first sample set in the camera coordinate system includes:

selecting at least three pixels from the pixels in the ground surface data by using a RANSAC algorithm, and using the three-dimensional coordinates of the at least three pixels in the camera coordinate system corresponding to the stereo camera as the first sample set;

generating, according to the first sample set, a current plane equation that conforms to the three-dimensional coordinates of pixels in the first sample set in the camera coordinate system;

determining whether the current plane equation satisfies a preset condition;

using the current plane equation as the second plane equation when the current plane equation satisfies the preset condition;

increasing the number of iterations by 1 when the current plane equation does not satisfy the preset condition and returning to perform the steps of selecting at least three pixels from pixels in the ground surface data, and using three-dimensional coordinates of the at least three pixels in the camera coordinate system corresponding to the stereo camera as a first sample set; wherein an initial value of the number of iterations is 0.

Preferably, the preset condition includes: the number of pixels, among the pixels in the ground surface data, that meet the current plane equation reaches a preset first threshold, or the number of iterations corresponding to the current plane equation reaches a preset second threshold.

Preferably, generating, according to the second sample set, the first plane equation in the camera coordinate system that conforms to the three-dimensional coordinates of the pixels in the ground surface data in the camera coordinate system includes:

performing fitting processing on the second sample set by using a least squares method to generate the first plane equation that conforms to the three-dimensional coordinates of the pixels in the ground surface data in the camera coordinate system.

Preferably, determining, according to the plane normal vector, a pitch angle of the stereo camera and an inclination angle of the stereo camera includes:

determining, in the camera coordinate system, a first angle by which a corresponding axis $z_c$ rotates about an axis x in a clockwise direction when the stereo camera rotates from a standard attitude to a current attitude, and using the first angle as the pitch angle of the stereo camera; and determining, in the camera coordinate system, a second angle by which a corresponding axis $x_c$ rotates about an axis z in a clockwise direction when the stereo camera rotates from the standard attitude to the current attitude, and using the second angle as the inclination angle of the stereo camera;

wherein a three-dimensional coordinate system defined by the axis $x_c$, the axis $z_c$, and an axis $y_c$ is the camera coordinate system; a three-dimensional coordinate system defined by the axis x, the axis z, and an axis y is a world coordinate system; when directions of the axis $x_c$ and the axis $z_c$ coincide with directions of the axis x and the axis z, and when direction of the axis $y_c$ is opposite to direction of the axis y, the stereo camera is in the standard attitude.

It can be seen that, in the application program embodiment of the present application, the second plane equation can be generated through multiple calculation iterations according to the three-dimensional coordinates of each pixel in the ground surface data in the camera coordinate system. Then, all the pixels of the ground surface data that conform to the second plane equation are determined, the least squares calculation is performed on these pixels, and the first plane equation which can represent the distribution pattern of all the pixels in the ground surface data can be obtained. In turn, the external parameters of the stereo camera can be determined according to the plane normal vector and the origin of the camera coordinate system. In this way, the method for determining external parameters of a stereo camera by ground surface data can be applied to most application scenarios, and is not only convenient but also ensures that the obtained external parameters are accurate and reliable.

It should be noted that, in the specification of the invention, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

The various embodiments in the present specification are described in a related manner. The same or similar parts between the various embodiments may be referred to each other, and each embodiment focuses on the differences from the other embodiments. In particular, for the system embodiment, since it is basically similar to the method embodiment, the description is relatively simple, and the relevant parts can be referred to the description of the method embodiment.

The above is only the preferred embodiments of the present application, and is not intended to limit the protection scope of the present application. Any modifications, equivalent substitutions, improvements, etc. made within the spirit and principles of the present application fall within the protection scope of the present application.

The invention claimed is:

1. A method for determining external parameters of a stereo camera, comprising:
    acquiring ground surface data of a location where the stereo camera is positioned, wherein the ground surface data includes a two-dimensional image and a disparity image of the ground surface or includes a two-dimensional image and a depth image of the ground surface;
    generating, according to three-dimensional coordinates of each of pixels in the ground surface data in a camera coordinate system corresponding to the stereo camera, a first plane equation in the camera coordinate system that conforms to the three-dimensional coordinates of the pixels;
    determining, according to a distance between an origin of the camera coordinate system and the ground surface, a setting height of the stereo camera;
    generating, according to the first plane equation, a plane normal vector corresponding to the first plane equation; and
    determining, according to the plane normal vector, the external parameters of the stereo camera without using a vertical edge perpendicular to the ground in a scene as a reference point, wherein the external parameters comprises a pitch angle of the stereo camera and an inclination angle of the stereo camera.

2. The method according to claim 1, further comprising:
    performing filtering processing on the ground surface data when the ground surface data does not meet a preset condition; wherein the filtering processing comprises median filtering in time domain and median filtering in spatial domain.

3. The method according to claim 1, wherein, generating, according to three-dimensional coordinates of each of pixels in the ground surface data in a camera coordinate system corresponding to the stereo camera, a first plane equation in the camera coordinate system that conforms to the three-dimensional coordinates of the pixels comprises:
    selecting at least three pixels from pixels in the ground surface data, and using three-dimensional coordinates of the at least three pixels in the camera coordinate system corresponding to the stereo camera as a first sample set;
    generating, according to the first sample set, a second plane equation that conforms to three-dimensional coordinates of pixels in the first sample set in the camera coordinate system;
    determining, among the pixels in the ground surface data, all pixels that meet the second plane equation, and using the three-dimensional coordinates of the pixels that meet the second plane equation in the camera coordinate system as a second sample set; and
    generating, according to the second sample set, the first plane equation in the camera coordinate system that conforms to the three-dimensional coordinates of the pixels in the ground surface data in the camera coordinate system.

4. The method according to claim 3, wherein, generating, according to the second sample set, the first plane equation in the camera coordinate system that conforms to the three-dimensional coordinates of the pixels in the ground surface data in the camera coordinate system comprises:
    performing fitting processing on the second sample set by using a least squares method to generate the first plane equation that conforms to the three-dimensional coordinates of the pixels in the ground surface data in the camera coordinate system.

5. The method according to claim 3, wherein, selecting at least three pixels from pixels in the ground surface data comprises:
    selecting at least three pixels from the pixels in the ground surface data by using a random sample consensus RANSAC algorithm.

6. The method according to claim 5, wherein, selecting at least three pixels from pixels in the ground surface data, and using three-dimensional coordinates of the at least three pixels in the camera coordinate system corresponding to the stereo camera as a first sample set and generating, according to the first sample set, a second plane equation that conforms to three-dimensional coordinates of pixels in the first sample set in the camera coordinate system comprises:
    selecting at least three pixels from the pixels in the ground surface data by using a RANSAC algorithm, and using the three-dimensional coordinates of the at least three pixels in the camera coordinate system corresponding to the stereo camera as the first sample set;
    generating, according to the first sample set, a current plane equation that conforms to the three-dimensional coordinates of pixels in the first sample set in the camera coordinate system;
    determining whether the current plane equation satisfies a preset condition;
    using the current plane equation as the second plane equation when the current plane equation satisfies the preset condition;
    increasing the number of iterations by 1 when the current plane equation does not satisfy the preset condition and returning to perform the steps of selecting at least three pixels from pixels in the ground surface data, and using three-dimensional coordinates of the at least three pixels in the camera coordinate system corresponding to the stereo camera as a first sample set; wherein an initial value of the number of iterations is 0.

7. The method according to claim 6, wherein, the preset condition comprises:
    the number of pixels, among the pixels in the ground surface data, that meet the current plane equation reaches a preset first threshold, or the number of iterations corresponding to the current plane equation reaches a preset second threshold.

8. The method according to claim 1, wherein, determining, according to the plane normal vector, a pitch angle of the stereo camera and an inclination angle of the stereo camera comprises:
    determining, in the camera coordinate system, a first angle by which a corresponding axis $z_c$ rotates about an axis x in a clockwise direction when the stereo camera rotates from a standard attitude to a current attitude, and using the first angle as the pitch angle of the stereo camera; and determining, in the camera coordinate system, a second angle by which a corresponding axis $x_c$ rotates about an axis z in a clockwise direction when the stereo camera rotates from the standard attitude to the current attitude, and using the second angle as the inclination angle of the stereo camera;

wherein a three-dimensional coordinate system defined by the axis $x_c$, the axis $z_c$, and an axis $y_c$ is the camera coordinate system; a three-dimensional coordinate system defined by the axis x, the axis z, and an axis y is a world coordinate system; when directions of the axis $x_c$ and the axis $z_c$ coincide with directions of the axis x and the axis z, and when direction of the axis $y_c$ is opposite to direction of the axis y, the stereo camera is in the standard attitude.

9. A non-transitory storage medium, which is used for storing executable program codes, wherein the executable program codes, when being executed, are configured to implement the method for determining external parameters of a stereo camera according to claim 1.

10. A device for determining external parameters of a stereo camera, comprising:
an acquiring unit, configured for acquiring ground surface data of a location where the stereo camera is positioned, wherein the ground surface data includes a two-dimensional image and a disparity image of the ground surface or includes a two-dimensional image and a depth image of the ground surface;
a first generating unit, configured for generating, according to three-dimensional coordinates of each of pixels in the ground surface data in a camera coordinate system corresponding to the stereo camera, a first plane equation in the camera coordinate system that conforms to the three-dimensional coordinates of the pixels;
a first determining unit, configured for determining, according to a distance between an origin of the camera coordinate system and the ground surface, a setting height of the stereo camera;
a second generating unit, configured for generating, according to the first plane equation, a plane normal vector corresponding to the first plane equation; and
a second determining unit, configured for determining, according to the plane normal vector, the external parameters of the stereo camera without using a vertical edge perpendicular to the ground in a scene as a reference point, wherein the external parameters comprises a pitch angle of the stereo camera and an inclination angle of the stereo camera.

11. The device according to claim 10, wherein, the device further comprises:
a filtering unit, configured for performing filtering processing on the ground surface data when the ground surface data does not meet a preset condition; wherein the filtering processing comprises median filtering in time domain and median filtering in spatial domain.

12. The device according to claim 10, wherein, the first generating unit comprises:
a first selecting subunit, a first generating subunit, a first determining subunit, and a second generating subunit; wherein
the first selecting subunit is configured for selecting at least three pixels from pixels in the ground surface data, and using three-dimensional coordinates of the at least three pixels in the camera coordinate system corresponding to the stereo camera as a first sample set;
the first generating sub-unit is configured for generating, according to the first sample set, a second plane equation that conforms to three-dimensional coordinates of pixels in the first sample set in the camera coordinate system;
the first determining subunit is configured for determining, among the pixels in the ground surface data, all pixels that meet the second plane equation, and using the three-dimensional coordinates of the pixels that meet the second plane equation in the camera coordinate system as a second sample set; and
the second generating sub-unit is configured for generating, according to the second sample set, the first plane equation in the camera coordinate system that conforms to the three-dimensional coordinates of the pixels in the ground surface data in the camera coordinate system.

13. The device according to claim 12, wherein, the first selecting subunit is further configured for selecting at least three pixels from the pixels in the ground surface data by using a random sample consensus RANSAC algorithm.

14. The device according to claim 12, wherein, the second generating subunit is further configured for performing fitting processing on the second sample set by using a least squares method to generate the first plane equation that conforms to the three-dimensional coordinates of the pixels in the ground surface data in the camera coordinate system.

15. The device according to claim 13, wherein, the first generating subunit comprises: a second selecting subunit, a third generating subunit, a determining subunit, a second determining subunit, and a returning and performing subunit; wherein,
the second selecting subunit is configured for selecting at least three pixels from the pixels in the ground surface data by using a RANSAC algorithm, and using the three-dimensional coordinates of the at least three pixels in the camera coordinate system corresponding to the stereo camera as the first sample set;
the third generating subunit is configured for generating, according to the first sample set, a current plane equation that conforms to the three-dimensional coordinates of pixels in the first sample set in the camera coordinate system;
the determining subunit is configured for determining whether the current plane equation satisfies a preset condition;
the second determining subunit is configured for using the current plane equation as the second plane equation when the current plane equation satisfies the preset condition;
the returning and performing subunit is configured for increasing the number of iterations by 1 when the current plane equation does not satisfy the preset condition and returning to perform the steps of selecting at least three pixels from pixels in the ground surface data, and using three-dimensional coordinates of the at least three pixels in the camera coordinate system corresponding to the stereo camera as a first sample set; wherein an initial value of the number of iterations is 0.

16. The device according to claim 15, wherein, the preset condition comprises:
the number of pixels, among the pixels in the ground surface data, that meet the current plane equation reaches a preset first threshold, or the number of iterations corresponding to the current plane equation reaches a preset second threshold.

17. The device according to claim 10, wherein, the second determining unit comprises: a third determining subunit and a fourth determining subunit; wherein, the third determining subunit is configured for determining, in the camera coordinate system, a first angle by which a corresponding axis $z_c$ rotates about an axis x in a clockwise direction when the stereo camera rotates from a standard attitude to a current attitude, and using the first angle as the pitch angle of the stereo camera; and the fourth determining sub-unit is configured for determining, in the camera coordinate system, a second angle by which a corresponding axis $x_c$ rotates about an axis z in a clockwise direction when the stereo camera rotates from the standard attitude to the current attitude, and using the second angle as the inclination angle of the stereo camera;

wherein a three-dimensional coordinate system defined by the axis $x_c$, the axis $z_c$, and an axis $y_c$ is the camera coordinate system; a three-dimensional coordinate system defined by the axis x, the axis z, and an axis y is a world coordinate system; when directions of the axis $x_c$ and the axis $z_c$ coincide with directions of the axis x and the axis z, and when direction of the axis $y_c$ is opposite to direction of the axis y, the stereo camera is in the standard attitude.

18. A device for determining external parameters of a stereo camera, which comprises: one or more controllers, one or more memories, wherein the one or more memories are configured to store executable program codes; the executable program codes stored in the one or more memories are executed by the one or more controllers to perform:

acquiring ground surface data of a location where the stereo camera is positioned, wherein the ground surface data includes a two-dimensional image and a disparity image of the ground surface or includes a two-dimensional image and a depth image of the ground surface;

generating, according to three-dimensional coordinates of each of pixels in the ground surface data in a camera coordinate system corresponding to the stereo camera, a first plane equation in the camera coordinate system that conforms to the three-dimensional coordinates of the pixels;

determining, according to a distance between an origin of the camera coordinate system and the ground surface, a setting height of the stereo camera;

generating, according to the first plane equation, a plane normal vector corresponding to the first plane equation; and determining, according to the plane normal vector, the external parameters of the stereo camera without using a vertical edge perpendicular to the ground in a scene as a reference point, wherein the external parameters comprises a pitch angle of the stereo camera and an inclination angle of the stereo camera.

* * * * *